Jan. 17, 1939.　　　J. M. WILLIAMS　　　2,144,093
HEATING SYSTEM
Filed Dec. 2, 1936　　　4 Sheets-Sheet 1
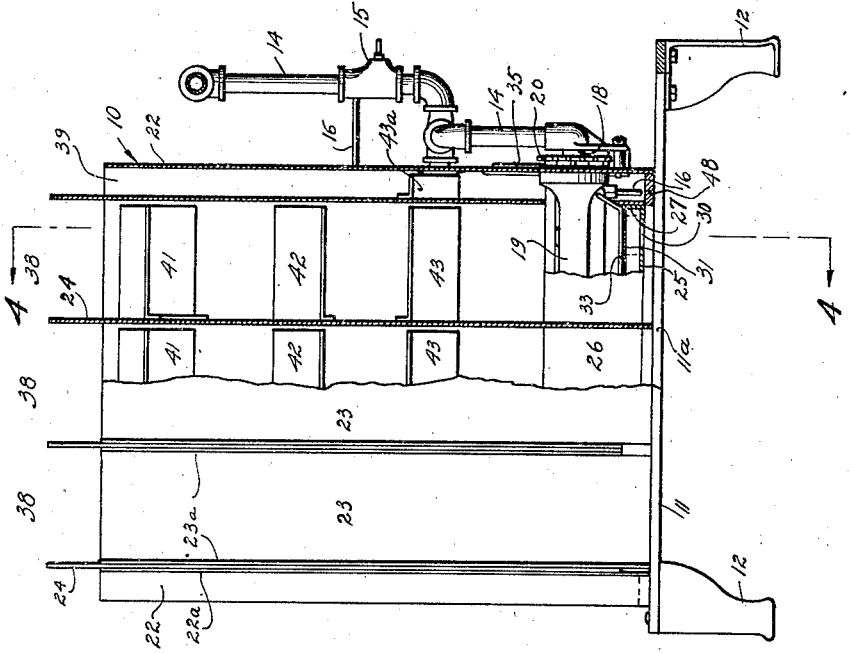
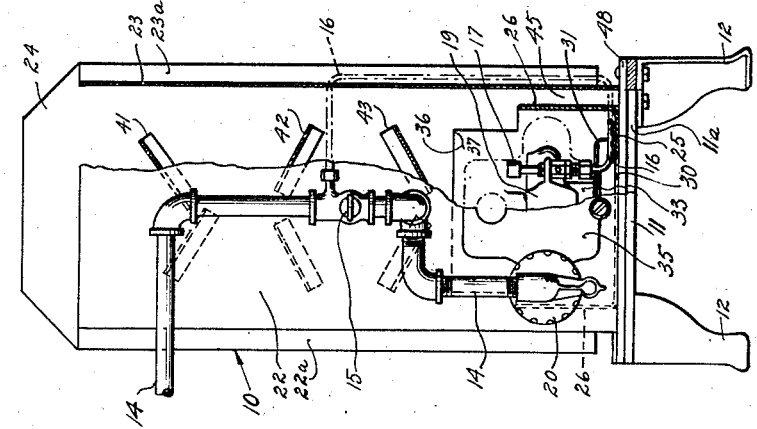
Inventor.
Jesse M. Williams.
Attorney.

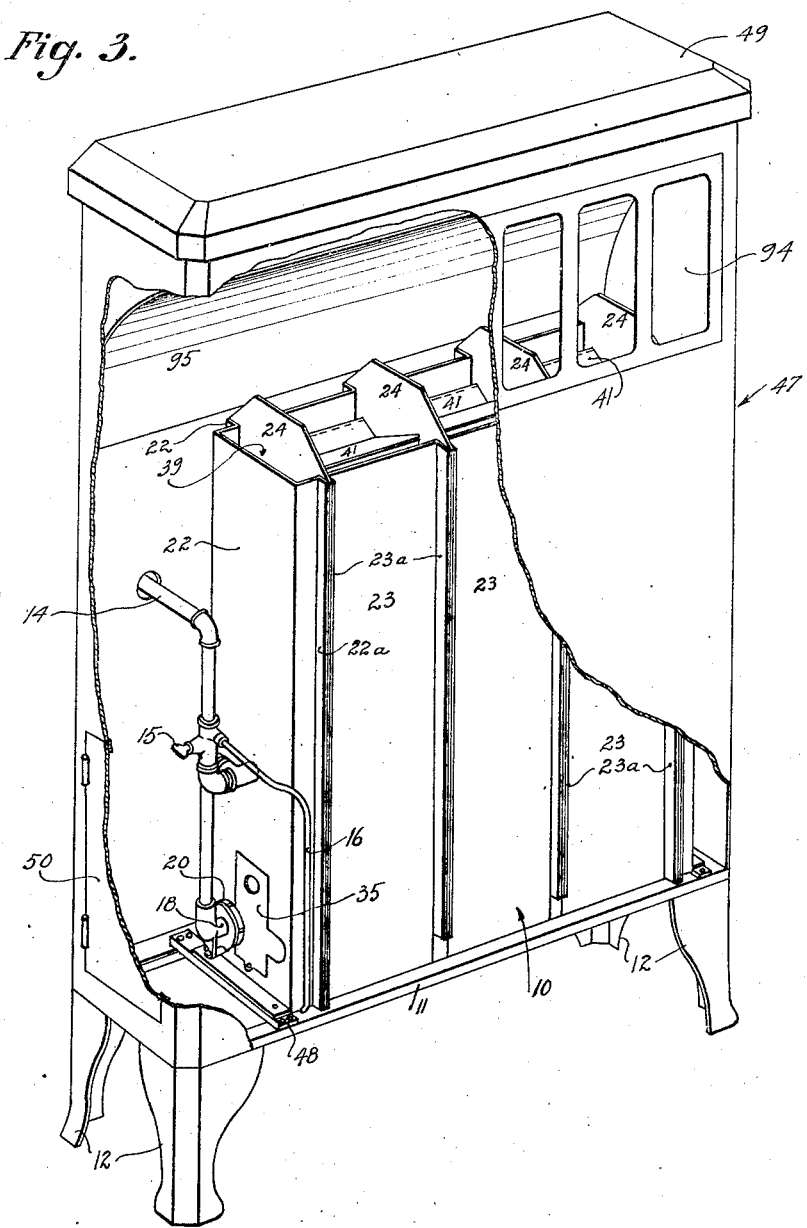

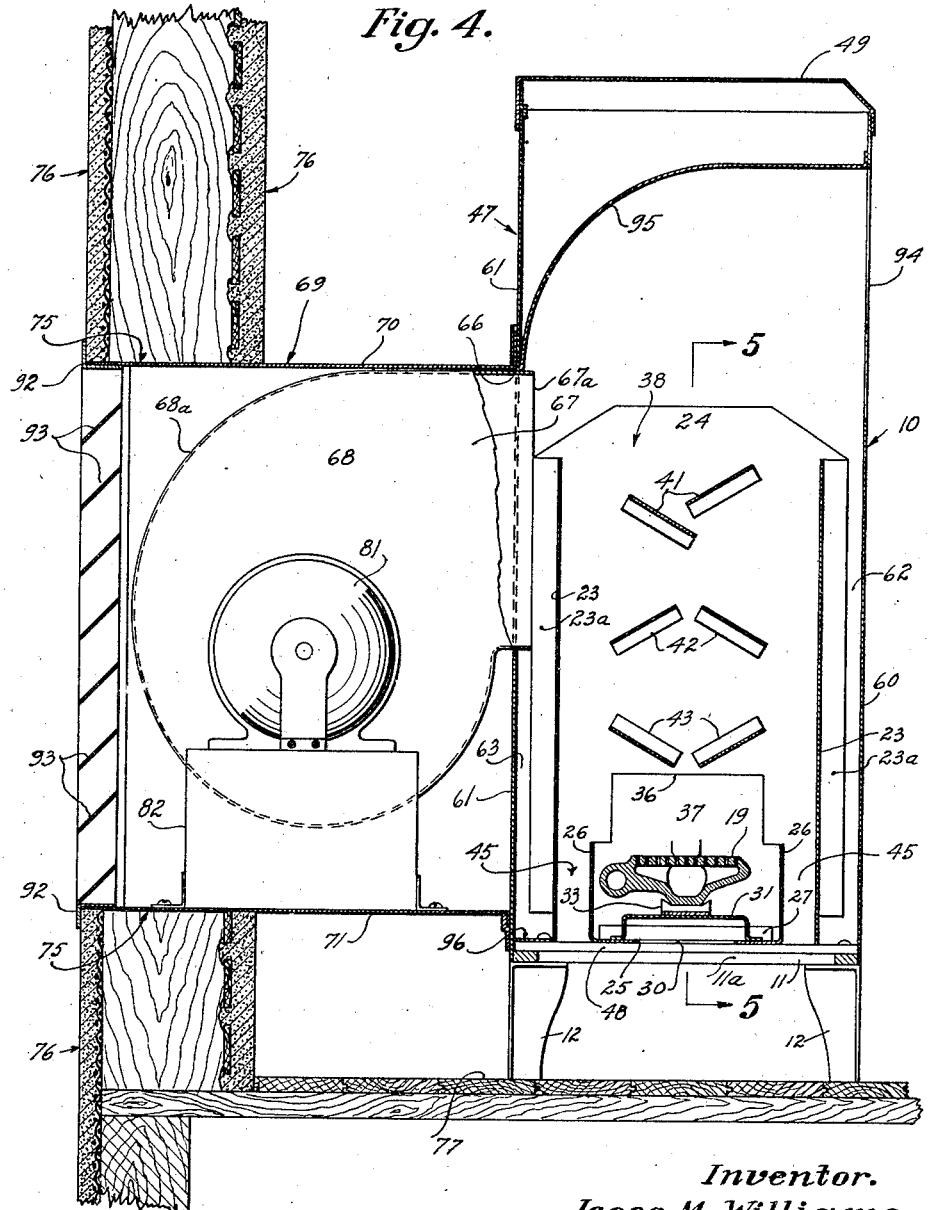

Jan. 17, 1939.  J. M. WILLIAMS  2,144,093
HEATING SYSTEM
Filed Dec. 2, 1936   4 Sheets-Sheet 4

Inventor.
Jesse M. Williams.

Attorney.

Patented Jan. 17, 1939

2,144,093

UNITED STATES PATENT OFFICE 2,144,093

HEATING SYSTEM

Jesse M. Williams, Los Angeles, Calif.

Application December 2, 1936, Serial No. 113,840

5 Claims. (Cl. 126—90)

This invention relates generally to air conditioning and heating systems of the class utilizing gas as fuel.

Gas heaters and heating systems in general use at the present time may be divided into those in which the air is heated directly by the gas flame, including heaters in which radiants are employed, such heaters circulating the products of combustion into the space to be heated, and heating systems of the furnace type in which the air circulated into the space to be heated is warmed indirectly, the products of combustion going up a flue.

With heaters of the first type, there is no loss of heat, but heating is often inefficient because such heaters heat to a relatively high degree a relatively small volume of air, which immediately rises to the top of the room. Radiants are of some benefit in this type of heater, in that they radiate into the room an increased proportion of the heat provided. Under such conditions objects within a short radius are warmed on one side by direct radiation, but those at a distance are poorly warmed because there is an insufficient volume of air heated to warm all of the air in the room. In some localities heaters of this type also produce an undesirably humid atmosphere, since all of the products of combustion are discharged into the room, including a large percentage of moisture, and there is frequently no provision for removing this moisture from the room. While a certain humidity is very greatly to be desired, heaters of this type sometimes produce so much humidity that cold surfaces such as window panes collect great quantities of moisture from the room atmosphere.

Furnace systems, of the second class mentioned above, are known to be inefficient of heat unless an excessive amount of heat is produced in the furnace. Thirty percent of the heat produced may pass up the flue and twenty percent be lost in the ducts below the floor, leaving but fifty percent of the heat produced for warming the room. Since humidity decreases with increase in temperature, furnaces of this type, in which no moisture is added to the heated air, produce an undesirably dry atmosphere. There is ample medical authority to the effect that breathing of unduly dried air is injurious to the human system.

It is accordingly an object of the present invention to provide a gas heating system in which the efficiency of heating is increased, and at the same time to provide a system in which the humidity of the heated air is established at a desirable level. That is, it is an object of the invention to provide a heating system designed to condition the air as regards humidity as well as to heat it.

A further primary object of the invention is to supply a large proportion of fresh, filtered air mixed with and warmed by the directly heated air, so that the air within the space to be heated may be continuously and rapidly changed.

My invention accomplishes these objects by circulating a large quantity of fresh, filtered air through a gas heater, preferably of special type particularly adapted to the system. Sufficient air is fed to the gas flame to properly support complete combustion, but not to blow the flame out, and a comparatively large volume of auxiliary air is introduced to the heater by means of a blower and is warmed by the directly heated air and then discharged into the room. The primary and essential feature of my invention is that the major proportion of this auxiliary air, say seventy-five percent or more, is drawn from outside the room in which the heater is situated, for example, from the outside atmosphere, and this outside air, preferably after filtering, is positively blown through the heater, being warmed by the heated air rising from the burner as it passes through the heater, and being then discharged to the room. Thus a very large volume of warmed air, humidified by the moisture of combustion of the gas, is forced by the blower into and through the space to be heated. A further feature of the system is that this large volume of warmed air is discharged into the room in a horizontal direction, and thus circulates around the room rather than rising immediately to the ceiling. As a result the vertical heating gradient of the room is greatly reduced, temperatures in the lower regions of the room being not greatly lower than ceiling temperature.

Due to the introduction of a large volume of outside air, in a ratio of approximately 6 to 1 with air directly heated by the burner, the percentage of moisture in the room atmosphere is adequate but is held within desirable limits. This large inflow of air to the heater and thence to the room means a corresponding outflow of air from the room, which may take place through any suitable vent, and this large outflow carries off the moisture of combustion, which might otherwise accumulate and collect on window panes, furniture, etc.

The invention will be best understood from the following detailed description of a present preferred embodiment thereof, reference for this purpose being had to the accompanying drawings, in which:

Fig. 1 is an end elevation of the gas heater employed in my heating system, a portion of the end wall of the heater being broken away in the figure;

Fig. 2 is a side elevation of the heater looking from the left of Fig. 1, with a portion of the side wall broken away;

Fig. 3 is a perspective view of the heater of Figs. 1 and 2 shown with the enclosing cabinet, portions of the cabinet wall being broken away to show the heater in place;

Fig. 4 is an enlarged transverse vertical section as on line 4—4 of Figs. 2 and 5, showing the cabinet walls, the air introduction flue, and the wall and floor construction of the room in which the heating system is installed;

Figure 5:
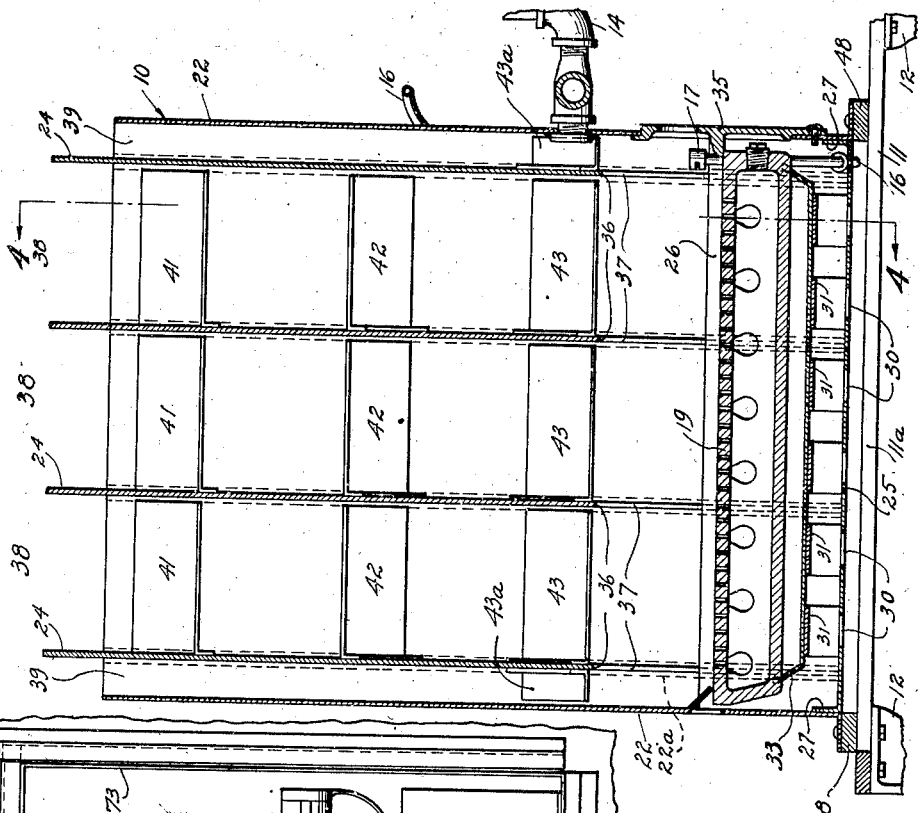
Fig. 5 is an enlarged longitudinal medial section on line 5—5 of Fig. 4.

A suitable gas heater adapted to the air conditioning system of the present invention will be described in detail. Referring now to Figs. 1 and 2, it will be seen that the heater, generally designated at 10, rests upon an open rectangular frame 11 and legs 12. Gas is supplied to the main burner through pipe 14 having manual control valve 15. By-pass 16 brings gas to pilot burner 17. Fuel is introduced from line 14 through nozzle 18 into burner 19 which may be of any conventional type. An air shutter 20 is mounted upon nozzle 18 to regulate the amount of air that is admitted into the burner orifice to be mixed with the gas to support combustion. The particular type of air shutter and gas nozzle assembly is of no importance and I am not to be considered as limited to the one shown herein. Since such devices are well known in the art, the particular construction illustrated will not be described in detail.

As may be seen particularly well in Fig. 3, the heater is composed of channel shaped ends 22 and side panels 23, all having flanges for the purpose of fastening together the various members. The flanges 22a on ends 22 and flanges 23a on adjacent side panels are attached to the vertical edges and on opposite faces of partition 24. This particular construction is preferred since it easily permits building a heater of any size by increasing or decreasing the number of panels 23, for the size or number of the sections formed by panels 23 may be changed as desired to suit the type of burner used. For simplicity of illustration I here show a heater comprising three sections, though at least double that number of sections will usually be employed in a commercial form of the heater. Referring now to Figs. 1 and 4, it will be seen that bottom 25 of the heater is the web of a channel shaped member turned up at the side to form flanges 26 which are spaced from walls 23 and extend upwardly to a point at or near the top level of burner 19. The ends of bottom 25 are turned up into flanges 27 (Figs. 2 and 5) by which the bottom member is fastened to the two end walls.

Apertures 30 are provided in bottom 25 for the admission of secondary air for purposes which will be later explained, and over each of these openings is a bridge 31 which performs the dual function of acting as a cover to prevent particles of hot carbon or other objects from dropping from the burner directly through the bottom opening onto the floor, and of acting as a baffle to check and disperse the stream of air entering the heater through the aperture beneath the bridge. This entering air stream is thus spread to flow up evenly around the burner instead of being concentrated in one place. Burner 19 is carried by longitudinal support 33 running across the tops of the several bridges 31 and turned up at the ends to receive the burner. By removing inspection plate 35 in an end wall 22, access may be had to the interior of the heater for removing or adjusting burner 19.

Partitions 24, in effect, sub-divide the entire heater into a plurality of sections of a length determined by the size of side panels 23. However, the central portion of each of the partitions is cut away as at 36 (Figs. 1 and 4) to form a longitudinally extending chamber 37 at the bottom of the heater adapted to receive the burner which extends substantially the full distance between ends 22. All or nearly all of the jet holes in the burner are within the sections formed by partitions 24, and from edge 36 upward these sections form a plurality of vertically extending air passages 38 over the burner. There are also two smaller air passages 39, one at each end of the burner, formed by ends 22 and the adjacent partition 24. The sections or passages 38 are all substantial duplicates of each other and of the one shown in cross section in Fig. 4.

In each of these sections or passages 38 there are arranged three pairs of inwardly converging baffle plates which are fastened to one partition 24 and extend across to the next partition. The upper and lower pairs of baffles, 41 and 43 respectively, converge downwardly while the intermediate pair of baffles 42 converges upwardly as shown in Fig. 4. It is preferred to stagger the top baffles 41, that is, one is placed higher than the other, so that the inner end of the upper baffle 41 is vertically over the inner end of the other or lower baffle 41. All of these baffle plates are spaced from each other at their inner ends and are spaced from sides 23 at their outer ends so as to leave openings for the passage of the rising hot air around the end of the baffles.

In passages 39 there are pairs of baffles 43a attached to a partition 24 and corresponding in position to baffles 43. Since there are no open flames directly beneath these end passages, the upper two pairs of baffles may be omitted if desired.

It will be recalled that primary air is admitted directly to the burner past air shutter 20 and that this air is mixed with the fuel gas before combustion. However, this supply of air is insufficient for complete combustion, and secondary air is admitted to the heater through bottom openings 30. This secondary air rises through these openings and strikes bridges 31 which cause the secondary air to flow up evenly around the entire length of burner 19 to help support combustion. As here illustrated, tertiary air is admitted through passages 45 which are formed by flanges 26 and sides 23, as may be seen in Figs. 1 and 4. Passages 45 are open at their lower ends and conduct this tertiary air upwardly to admit it to the burner interior at a point at or near the top level of burner 19. This tertiary air mingles with the heated secondary air rising from the burner to form a larger volume of air at lower temperature than results from introduction of secondary air alone.

This intermingling of the air streams is accomplished by baffles 41, 42, and 43 as these streams rise upwardly through passages 38. The hot gases rising directly from burner 19 first strike plate 43, and a portion of the gases passes through the central opening between the two plates while the larger portion is split into two parts which are deflected by the baffles toward the side walls. The stream of air entering through passages 45 has a tendency to rise vertically and is consequently mixed with the hot air as the latter is deflected sidewise along baffles 43.

The hot air stream deflected by baffles 43 strikes side walls 23 which deflect inwardly the combined hot and cold air currents so that they rise underneath baffles 42, although of course a portion of these intermingled air currents will rise around the outer ends of these intermediate baffle plates. The ascending air beneath plates 42 escapes through the central opening between these baffles where the air is additionally mixed, and then rises to strike the top baffles 41. Here again the ascending central air stream is divided, a portion leaving through the central opening between the baffles, but two larger portions being deflected one to each side, to again be intermingled with the air that has followed side walls 23. By this time the hot and cold air streams have been so thoroughly intermingled that the air is at an approximately uniform temperature.

A portion of the heated air will leave chamber 37 and rise upwardly through end passages 39 into which tertiary air is introduced at the end of passages 45. The hot and cold air streams are mixed by baffles 43a in the same manner as described above in connection with baffles 43.

The heater as now described is enclosed within an exterior enclosure or cabinet as seen in Figs. 3 and 4. This enclosure, generally designated at 47, has an open rectangular frame 11a somewhat larger than the heater unit within and upon which the heater is supported by cross members 48. Frame 11a rests on legs 12. The enclosure may be provided with a removable top 49 to permit insertion of the heater, access being had to the control valve by opening a door 50 in one end of the enclosure. The front and rear side walls 60 and 61 of the enclosure are spaced from the sides of the heater unit, forming air spaces 62 and 63, respectively.

Figure 6:
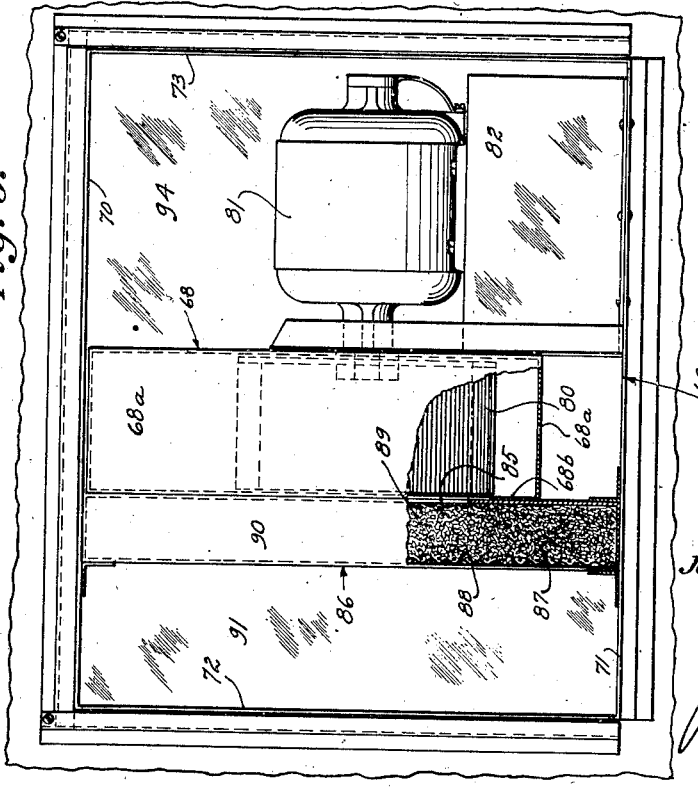
Fig. 6 is a rear end view of the flue shown in Fig. 4, being a view looking toward the right in Fig. 4.

Rear enclosure wall 61 has an approximately centrally located rectangular aperture 66, which receives the correspondingly shaped discharge end 67a of a blower conduit 67 through which air is discharged by a blower 68 mounted to the rear of the cabinet. In the embodiment of my invention here shown, this blower 68 is mounted in a rectangular housing 69, made up of top and bottom walls 70 and 71, respectively, and side walls 72 and 73 (Figs. 4 and 6). This housing is received within an aperture 75 formed in an exterior wall 76 of the building in which the heater is installed. Thus, the heater is shown as supported on floor 77 with the back wall 61 of the cabinet toward and spaced somewhat from wall 76, and with housing 69 extending from the rear of the cabinet through wall 76 and opening to atmosphere outside. It will be understood, however, that this showing of my invention is merely illustrative, and that the heater may if desired be itself enclosed within a wall of the building, in which event the blower housing will again be arranged to draw atmosphere from outside the building. Moreover, it is not essential that housing 69 be formed as illustrated in Fig. 4, since this housing, which as will appear serves as an exterior casing for, or as a part of, a fresh air conduit, may be as long, and as circuitous as may be necessary to suit local requirements.

In the embodiment here shown, walls 70 to 73 of housing 69 are formed with suitable flanged connections with the rearward wall 61 of the cabinet, as clearly indicated in the drawings. Blower 68 has a rotor 80 driven by an electric motor 81 mounted on a support 82 resting on wall 71, as illustrated. Blower casing 68a has in one side wall 68b an air inlet opening 85, and mounted directly against this opening is an air filter 86 comprising a layer of spun glass 87 confined between two parallel vertical screens 88 and 89 and enclosed at its edges by a casing 90. The other side of this filter, opened by screen 89, defines one side of a chamber 91 which opens rearwardly to atmosphere outside the wall of the building. Preferably, a rectangular frame 92 provided with shutter slats 93 is received within the outer end of housing 69, as shown in Fig. 4. This shutter member, which has been omitted in Fig. 6, admits air to chamber 91 to be drawn in through the air filter, and also admits air to motor chamber 94 to cool motor 81.

Thus blower 68 draws air from outside the building inwardly through chamber 91 and air filter 86 and discharges it through aperture 66 in the rearward wall of the exterior heater enclosure. This air rises through space 63 to mingle with the heated air rising from between heater side panels 23. A metal strip 96 placed between heater wall 23 and rear cabinet wall 61 forms a barrier at the lower end of space 63 and prevents escape of the introduced blower air in a downward direction. This auxiliary air introduced by the blower, after mixing with and being warmed by the heated air rising from between panels 23, is discharged from the heater cabinet in a horizontal direction through an open grill 94 formed in the upper portion of front cabinet wall 60. Preferably, a curved deflector 95 is mounted within the upper end of the cabinet to deflect the air and cause it to be projected outwardly in a horizontal direction from grill 94.

The vertical walls of the heater placed around and above the burner act as a stack or flue, which results in a very material increase in draft as compared with the draft accompanying a burner placed in the open. As the velocity of the air around the burner increases, there first results incomplete combustion, and finally the flame is blown out. This condition is overcome in the present heater first by restricting the air which passes around and past the burners to the secondary air, which is required to meet the needs of combustion, and next by the provision of the baffles above the burner, which tend to reduce the velocity of the heated air. A quantity of room air is then introduced above the burners (tertiary air), and a very much larger quantity of outdoor air (auxiliary air), in a ratio of for instance six to one with the total of heated air rising within heater walls 23, is introduced to the space 63 between the rearward heater wall 23 and the rear wall 61 of the cabinet. This auxiliary air is heated first by contact with the warmed side panels 23 of the heater, and next, as it passes over the heater, by contact with the heated air and products of combustion rising from the heater. As previously mentioned, the auxiliary air is introduced in a ratio of the order of for example, approximately six to one with the heated air and products of combustion rising from the heater. The auxiliary air is at out-door humidity, and is filtered of dust by the described air filter. This air is mixed with the highly heated air coming from between heater walls 23 directly over the heater unit, and the result is that a large volume of warmed air, at a temperature depending upon the ratio of blower or auxiliary air to air heated directly by the heater unit, is forcibly expelled in a horizontal direction from the upper end of the cabinet.

The characteristic of the system of the present invention is that a large volume of air is warmed within the heater, say of the order of six times the air which would be heated by a conventional gas heater of the same size. The air in the room is therefore heated to a comparatively uniform, moderate temperature. This is to be compared with the operation of a conventional gas heater, which heats a relatively small quantity of air to a very high temperature, resulting in a layer of high temperature, low density air next to the ceiling from which little or no heating service is obtained. A further feature of the invention is that this large volume of moderately heated air is projected by blower action into the room in a horizontal direction, and thus circulates around the room instead of rising immediately to the ceiling. As a result, the vertical heating gradient of the room is greatly reduced, temperatures in the lower regions of the room being not greatly below ceiling temperature.

Further, the improved heating system as here described maintains humidity at a desirable level. The proportion of moisture in the air which would be produced by the burner without the use of the auxiliary air is greatly reduced in diluting the products of gas combustion with the comparatively large volume of auxiliary air. Yet sufficient water vapor is produced by the burner to establish humidity at a desirable and healthful level. The large volume of air introduced to the room means that a corresponding volume of air must leave the room, and this latter air carries the moisture away and prevents it from accumulating in the room.

In warm weather, the system may be employed to circulate fresh filtered air to the rooms served by the system without the heater being lighted. It is well known that at the end of a hot day, the fall of temperature within a building or home lags behind the fall of temperature outside. The system is used at such time to circulate the cooler out-door air through the rooms and so lower their temperature.

Having described a preferred embodiment of my invention, I wish it to be understood that the foregoing description and illustrations are to be considered as illustrative of rather than restrictive upon the broader claims appended hereto, for various changes in design, arrangement and construction may be made without departing from the spirit and scope of said claims.

I claim:

1. In an air conditioning system, the combination of a gas burner, heater walls disposed around and extending upwardly from said burner to form an open topped flue, means for passing air exteriorly of the burner and upwardly within said heater walls, an exterior enclosure around said heater walls, said exterior enclosure having a side wall spaced from the heater walls and having a top spaced above the upper ends of said heater walls, said exterior enclosure having a hot air discharge opening in its upper portion, an air duct opening within the space between the exterior enclosure and said heater walls, and a blower for forcing a relatively large volume of air through said duct into the exterior enclosure to mix with the heated air rising from the upper end of said flue and thence to discharge by way of said discharge opening.

2. In an air conditioning system, the combination of a gas burner, heater walls disposed around and extending upwardly from said burner to form an open topped flue, means for passing air exteriorly of the burner and upwardly within said heater walls, an exterior enclosure around said heater walls, said exterior enclosure having a side wall spaced from the heater walls and having a top spaced above the upper ends of said heater walls, said exterior enclosure having a hot air discharge opening in one of its side walls near its upper end, an air duct opening within the space between the exterior enclosure and said heater walls, and a blower for forcing a relatively large volume of air through said duct into the exterior enclosure to mix with the heated air rising from the upper end of said flue and thence to discharge by way of said discharge opening.

3. In an air conditioning system for a room, the combination of a gas burner within the walls of the room, heater walls extending upwardly from said burner, an exterior enclosure spaced around the sides of said heater walls and extending over the top thereof, said heater walls having an outlet through which hot gases flow into a mixing chamber within said exterior walls, an air duct communicating with said mixing chamber and leading from atmosphere exterior of the room through a wall of the room and through one side wall of said exterior enclosure, a discharge opening in an opposite wall of said enclosure, and a blower for forcing a relatively large volume of air through said duct into said mixing chamber to mix with the heated air rising from between the heater walls and thence to discharge by way of said discharge opening.

4. In an air conditioning system, the combination of a gas burner, substantially vertical heater walls disposed around and extending upwardly from said burner to form an open topped flue, an apertured bottom below the burner admitting air to pass upwardly through said heater walls, an exterior enclosure comprising parallel front and rear side walls and end walls surrounding said heater walls, and a top disposed over and spaced from the upper edges of said heater walls, a heated-air discharge opening in the front wall of said enclosure near the upper edge thereof, an air conduit opening within the rear wall of said enclosure, means forming a closure between the front, rear and end walls of the exterior enclosure and said heater walls, said means passing below the point at which the air conduit opens within the exterior enclosure, and a blower in said air conduit for forcing auxiliary air into and through the upper portion of the exterior enclosure in an amount which is relatively large as compared with the highly heated air rising from between the heater walls, said auxiliary air mixing with and being warmed by the heated air rising from between the heater walls as it passes through the upper portion of the exterior enclosure, and being finally discharged from said discharge opening in the front wall of the enclosure.

5. In an air conditioning system, a gas burner, a conduit extending upwardly from said burner and receiving combustion gases therefrom, said conduit having an outlet positioned a substantial distance above the burner, means for supplying air to said conduit exteriorly of the burner to be admixed with combustion gases leaving the burner, means for supplying a second and separate stream of air to said conduit, walls forming a mixing chamber at said conduit outlet and a discharge opening through which admixed combustion gases and air leave the chamber, and means including a blower for discharging a stream of air through said chamber and the discharge opening in a direction away from said outlet so that the blower air will not tend to enter same.

JESSE M. WILLIAMS.